United States Patent
Pennington

(10) Patent No.: US 9,221,322 B2
(45) Date of Patent: Dec. 29, 2015

(54) DEVICE FOR RESTRICTING WIND TURBULENCE

(71) Applicant: King Penn Industries, Inc., Dallas, TX (US)

(72) Inventor: Stephen Pennington, Garland, TX (US)

(73) Assignee: King Penn Industries, Inc., Dallas, TX (US)

( * ) Notice: Subject to any disclaimer, the term of this patent is extended or adjusted under 35 U.S.C. 154(b) by 0 days.

(21) Appl. No.: 14/257,326

(22) Filed: Apr. 21, 2014

(65) Prior Publication Data

US 2015/0298530 A1    Oct. 22, 2015

(51) Int. Cl.
*B60J 9/00* (2006.01)
*B60J 9/04* (2006.01)
*F21V 33/00* (2006.01)
*B60J 7/22* (2006.01)
*B60Q 1/26* (2006.01)

(52) U.S. Cl.
CPC ............... *B60J 7/223* (2013.01); *B60Q 1/2661* (2013.01)

(58) Field of Classification Search
CPC ......... B25C 5/11; B25C 5/162; B25C 5/1696; B60J 7/223
USPC ................. 296/180.1, 146.8, 216.8, 106, 85, 296/180.2, 217, 180.5
See application file for complete search history.

(56) References Cited

U.S. PATENT DOCUMENTS

| | | | |
|---|---|---|---|
| 5,024,481 A * | 6/1991 | Swersky ................... 296/180.1 |
| 5,172,954 A * | 12/1992 | Yamazaki et al. ......... 296/180.1 |
| 7,699,381 B2 * | 4/2010 | Goetz et al. ............... 296/180.1 |
| 7,980,623 B2 * | 7/2011 | Rossi ......................... 296/180.2 |
| 8,210,598 B2 * | 7/2012 | Lehmann et al. .......... 296/180.1 |
| 2007/0040413 A1* | 2/2007 | Rimmelspacher et al. 296/180.5 |
| 2008/0238155 A1* | 10/2008 | Pennington .................. 296/217 |

* cited by examiner

*Primary Examiner* — Glenn Dayoan
*Assistant Examiner* — Sunsurraye Westbrook
(74) *Attorney, Agent, or Firm* — Winstead PC

(57) ABSTRACT

Disclosed is a device for restricting wind turbulence in a moving open top automobile. The device comprises an elongate wind panel adapted to be secured to the double seat or the pair of non-contiguous juxtaposed seats thereof such that, the wind panel vertically, upwardly and contiguously extends from the seat.

18 Claims, 7 Drawing Sheets

DEVICE FOR RESTRICTING WIND TURBULENCE

BACKGROUND

Field of the Invention

The present invention relates to automobile accessories and more particularly to a device for restricting wind turbulence in the cabin of a moving open-top automobile.

Wind turbulence is experienced by travelers traveling in an open-top automobile. Wind turbulence, which generally comes into play when traveling at speeds above 40 mph, increases proportionate to the increase in the automobile speed. Wind turbulence is unrelenting and bothersome causing humming noises, muffling of one's voice and the voices of fellow passengers, muffling the sounds emanating from the music system installed in the automobile, causing one's hair (especially, long hair) to tangle, etc., ultimately ruining the fun and thrill in driving the automobile and/or taking the ride in the automobile.

SUMMARY

The present invention comprises a device for restricting the wind turbulence in the cabin of a moving automobile. The device is simple in construction comprising an elongate wind panel adapted to be secured to the double seat (or to a pair of non-contiguous juxtaposed seats) of the automobile such that, the wind panel is vertically, upwardly, and contiguously extends from the top of the seat (or the pair of seats) of the automobile. The wind panel relatively locks the wind within the cabin thus automatically calming down the wind turbulence therewithin to a degree that the aforementioned affects of wind turbulence are nullified.

Other objects and advantages of the embodiments herein will become readily apparent from the following detailed description taken in conjunction with the accompanying drawings.

FIGURES—REFERENCE NUMERALS

10—Device
12—Wind Panel
14—Top Section
16—Bottom Section
18—Insert Panel
20—Headrest
22—Seat
24—Control Unit
26—Illumination Lining
28—Illumination Artwork

DETAILED DESCRIPTION

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The present invention comprises a device, which is an automobile accessory, for restricting wind turbulence in the cabin of a moving open-top automobile. The device is adapted to be secured to the double seat or the non-contiguous juxtaposed seats of the automobile provided the double seat (or the seats together) comprises a pair of headrests with a standardized distance of separation therebetween. More particularly, the device, as will become apparent from the following body of text, is adapted to be locked between the seat (or seats) and the headrests so as to secure device to the seat (or seats). Notably, the device is capable of installation on automobiles that are both two and four seaters.

Figure 1:
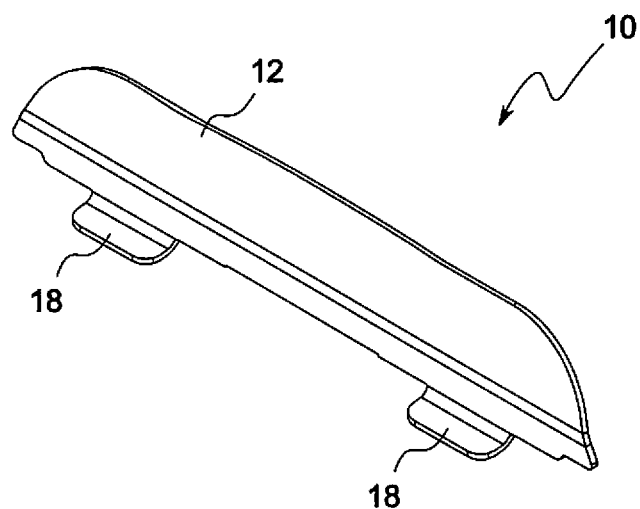
FIG. 1, according to an embodiment of the present invention, is an illustration of the front perspective view of the device.
Figure 2:
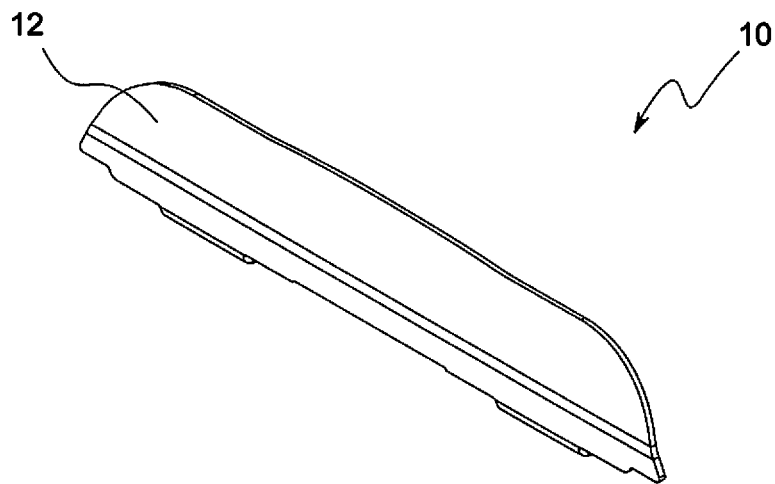
FIG. 2, according to an embodiment of the present invention, is an illustration of the rear perspective view of the device.
Figure 3:
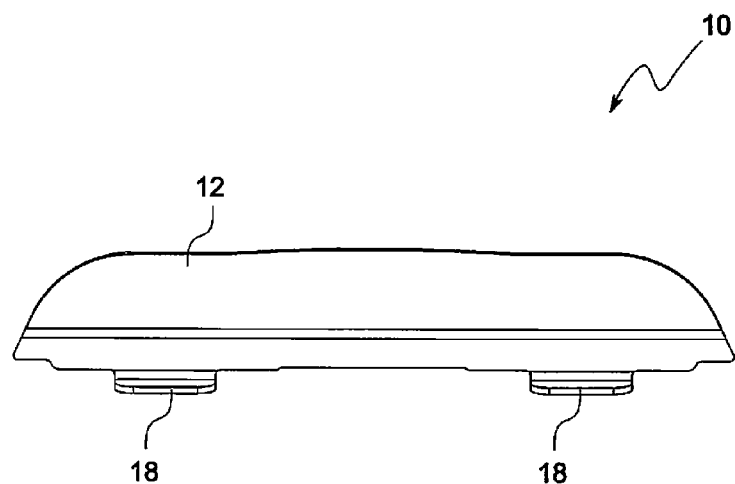
FIG. 3, according to an embodiment of the present invention, is an illustration of the front view of the device.
Figure 4:
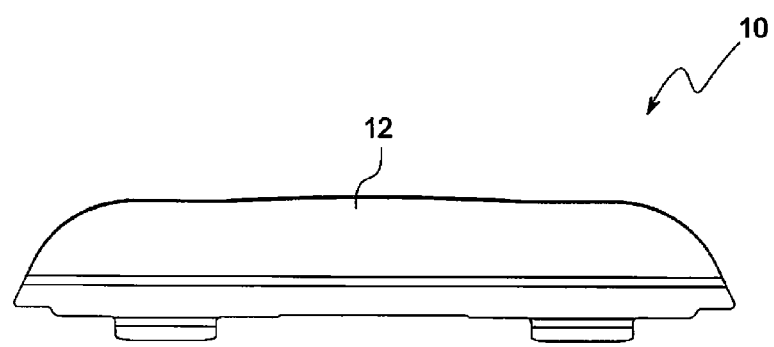
FIG. 4, according to an embodiment of the present invention, is an illustration of the rear view of the device.
Figure 5:
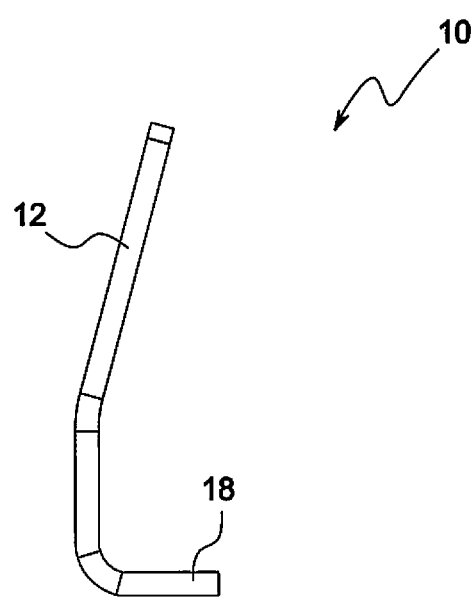
FIG. 5, according to an embodiment of the present invention, is an illustration of the side view of the device.
Figure 6:
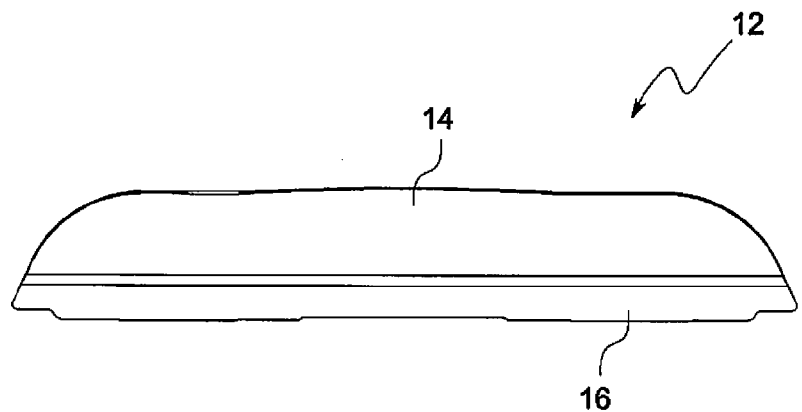
FIG. 6, according to an embodiment of the present invention, is an illustration of the front view of the wind panel.
Figure 7:
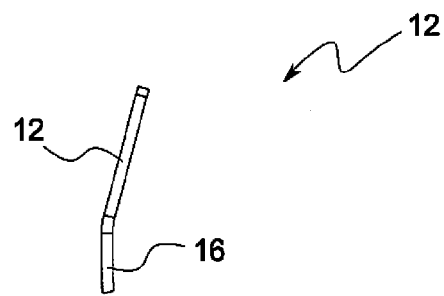
FIG. 7, according to an embodiment of the present invention, is an illustration of the side view of the wind panel.

Referring to FIGS. 1 through 7, the device 10 is simple in construction comprising a rectangular wind panel 12 with the top corners thereof being preferably curved off. Referring particularly to FIGS. 6 and 7, the wind panel 12 is divided into top and bottom longitudinal sections 14 and 16 wherein the angle therebetween ranges from zero to fifteen degrees with the bottom section 16 being vertically oriented upon the installation of the device 10. More particularly, the preferable angle between the top and bottom sections 14 and 16 is fifteen degrees, the utility of which will become apparent from the following body of text. Further, a pair of identical and spaced-apart insert panels 18 extend integrally and perpendicularly from the bottom edge of bottom section 16 (of the wind panel 12) wherein, the distance between the insert panels 18 is equivalent to the standardized distance between the headrests of an automobile.

Generally, a headrest of an automobile comprises a pair of metal connecting rods that extend downwardly from the bottom thereof. The connecting rods are adapted to be hingedly coupled to a pair of connectors disposed on top of the corresponding seat so as to secure the headrest to the seat such that, the headrest may be tilted forward or downward for further adjustments. In some automobiles, the connecting rods may extend upwardly from the seat, whereas, the connectors may be disposed on the headrest. In any case, as a result of securing the headrest to the seat, a horizontal hole is formed between the pair of connector rods, the top of the seat and the bottom of the headrest. The horizontal hole, owing to the spongy nature of the material generally used on seats and headrests, is so narrow that it is not visually agape and hence, simply, not visible.

Figure 8A:
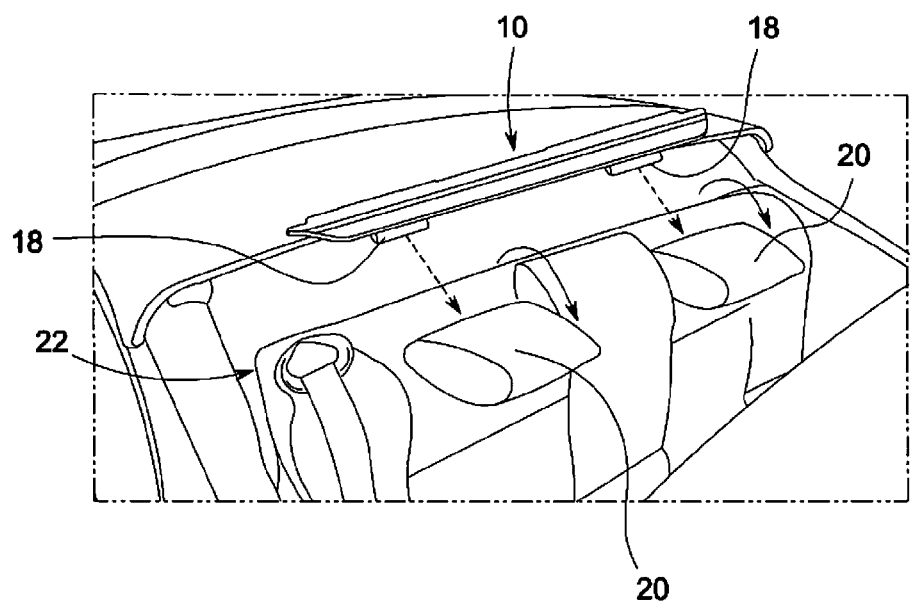
FIGS. 8A through 8C, according to an embodiment of the present invention, are the sequential illustrations depicting the installation of the device.
Figure 8B:
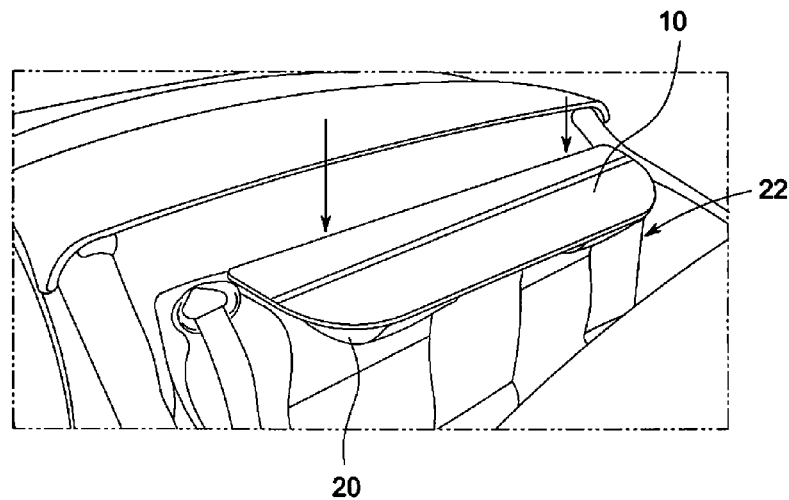
Figure 8C:
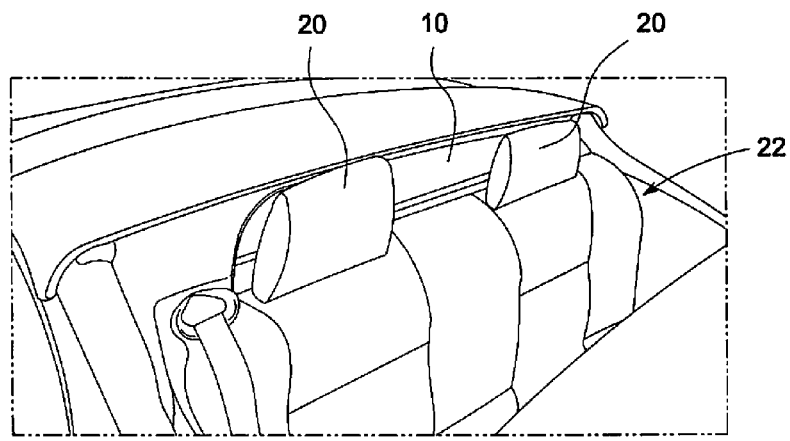
Figure 9:
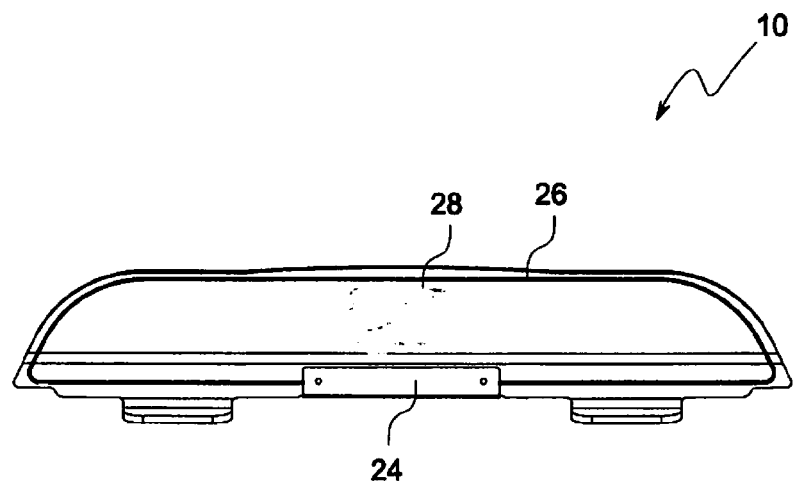
FIG. 9 is a front view of an additional embodiment of the device.
Figure 10:
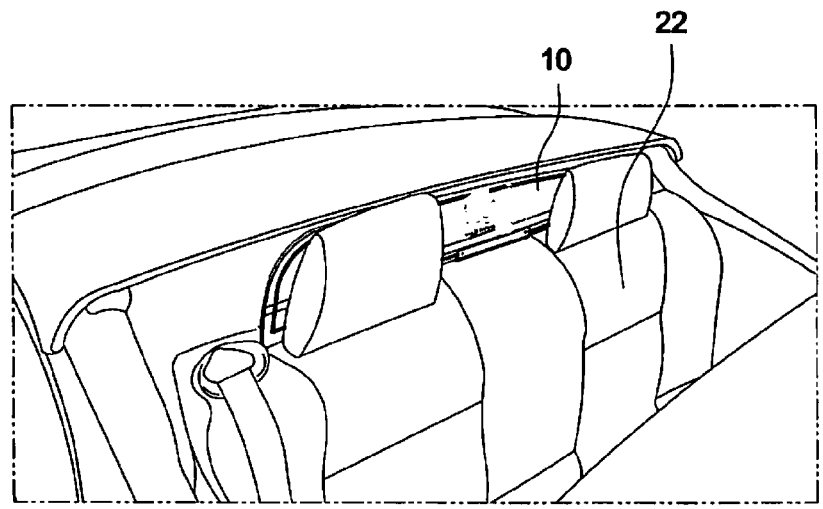
FIG. 10, according to the additional embodiment of the present invention, is an illustration of the device installed on the automobile seat.

Referring to FIGS. 8A through 8C, in order to install the device 10, initially, the headrests 20 of the seat 22 are pressed or tilted downward (as seen in FIG. 8) whereafter, each insert panel 18 is thoroughly inserted into the aforementioned horizontal space until the front surface of the wind panel 12 abuts the rear surfaces of the headrests 20 as shown in FIG. 9. Once there, the headrests 20 are released or pushed back into vertical positions thereof at which point, the device 10 mechanically locks into place (as seen in FIG. 10). Upon installation, the aforementioned fifteen degree angle between the top and bottom sections 14 and 16 of the wind panel 12 will cause the wind panel 12 to abut against the rear of the headrests 20 thereby becoming one therewith. The device 10 is preferably made of glass or plastic.

Referring to FIGS. 9 and 10, in an additional embodiment of present invention, the edges of the wind panel 12 are lined with an illumination lining 26 for emanating light. In one embodiment, the illumination lining 26 is embedded into the edges of the wind panel 12. The illumination lining 26 preferably comprises a series of Light Emitting Diodes (LEDs) that are powered by electrical energy either from the automobile or from an external electrical source. In either case, the electrical energy for the illumination lining 26 is routed via a control unit 24, which may comprise an activation means for activating or deactivating the illumination lining 26. In one embodiment, the control unit 24 may include a selection means for selecting the color of light that is illuminated.

Still referring to FIGS. 9 and 10, in the additional embodiment of present invention, the wind panel 12 further comprises an illumination artwork 28 located centrally thereon wherein, the illumination artwork 28 preferably comprises a multiplicity of LEDs centrally embedded into wind panel 12 to form an artwork or design, such as a logo. Similar to the illumination lining, the illumination artwork 28 too is may be powered either by the automobile itself or an external electrical source. In either case, the electrical energy for the illumination artwork 28 is routed via the control unit 24, which may include a selection means for selecting the color of light that is illuminated by the illumination artwork 28.

The foregoing description of the specific embodiments herein so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the invention with modifications. However, all such modifications are deemed to be within the scope of the claims.

What is claimed is:

1. A device for restricting wind turbulence in a cabin of a moving open top automobile, the device comprising:
    an elongate wind panel adapted to be secured to a double seat or a pair of non-contiguous juxtaposed seats thereof such that, the wind panel vertically, upwardly and contiguously extends from the seat; and
    a pair of spaced-apart insert panels extending horizontally from a bottom of the wind panel, each of the pair of spaced-apart insert panels being adapted for insertion into a horizontal space between a headrest and a top of a seat.

2. The device of claim 1 wherein each of the pair of spaced-apart insert panels integrally extends from the bottom of the wind panel.

3. The device of claim 1 wherein each of the pair of spaced-apart insert panels is substantially perpendicular to the wind panel whereby, and the headrests need to be tilted downward in order for each of the pair of insert panels to be received into the horizontal spaces.

4. The device of claim 1 wherein a surface of the wind panel abuts a rear surface of the headrests as the wind panel is secured to the double seat or the pair of non-contiguous juxtaposed seats.

5. The device of claim 1 wherein the double seat or the pair of non-contiguous juxtaposed seats comprises a rear seat or seats, respectively, of the automobile.

6. The device of claim 1 wherein the wind panel is substantially rectangular in shape.

7. The device of claim 1 wherein top corners of the wind panel are curved off.

8. The device of claim 1 wherein the wind panel is made of glass.

9. The device of claim 1 wherein the wind panel is made of acrylic plastic.

10. The device of claim 1 wherein at least one edge of the wind panel is lined with an illumination lining for emanating light.

11. The device of claim 10 wherein an electrical energy for activation of light from the illumination lining is directed from a control unit secured to the wind panel.

12. The device of claim 10 wherein a light source for the illumination lining comprises a plurality of Light Emitting Diodes (LEDs).

13. The device of claim 1 wherein the wind panel comprises a centrally-disposed illumination artwork.

14. The device of claim 13 wherein a power for an activation of light from the illumination artwork is directed from a control unit secured to the wind panel.

15. The device of claim 13 wherein a light source for the illuminating artwork comprises a plurality of Light Emitting Diodes (LEDs).

16. The device of claim 13 wherein a light from an illumination lining is directed from a control unit secured to the wind panel.

17. A device for restricting wind turbulence in a moving open top automobile, the device comprising:
    an elongate wind panel comprising a pair of spaced-apart insert panels extending from a bottom thereof, each insert panel being adapted for insertion into a horizontal space formed between the headrest and a corresponding seat thereof thereby locking the insert panels therewithin.

18. A device for restricting wind turbulence in a moving open top automobile, the device comprising a substantially rectangular, elongate wind panel comprising a pair of spaced-apart insert panels extending integrally and substantially perpendicularly from a bottom thereof, each insert panel of the pair of spaced-apart insert panels being adapted for insertion into a horizontal space formed between a headrest and a corresponding seat thereby locking the insert panels therewithin.

* * * * *